(12) United States Patent
Kennard, IV

(10) Patent No.: US 6,357,717 B1
(45) Date of Patent: Mar. 19, 2002

(54) VIBRATION CONTROL DEVICE

(75) Inventor: Samuel M. Kennard, IV, Clayton, MO (US)

(73) Assignee: Kennard Industries, Inc., St. Louis, MO (US)

(*) Notice: Subject to any disclaimer, the term of this patent is extended or adjusted under 35 U.S.C. 154(b) by 0 days.

(21) Appl. No.: 09/283,480

(22) Filed: Apr. 1, 1999

(51) Int. Cl.[7] ................................................ F16M 1/00
(52) U.S. Cl. ....................... 248/638; 248/562; 248/633
(58) Field of Search ............................... 248/638, 560, 248/636, 568, 562, 677, 633, 632

(56) References Cited

U.S. PATENT DOCUMENTS

| | | |
|---|---|---|
| 700,977 A | 5/1902 | Olsen |
| 1,345,987 A | 7/1920 | Bocking |
| 1,374,029 A | 4/1921 | Prickett |
| 1,746,902 A | 2/1930 | Persons |
| 1,912,728 A | 6/1933 | Roe |
| 1,969,266 A | 8/1934 | Herold |
| 2,317,080 A | 4/1943 | Phillips |
| 2,942,829 A | 6/1960 | Stiffel |
| 2,963,256 A | 12/1960 | Borah |
| 2,968,116 A | 1/1961 | Arenson |
| 3,126,666 A | 3/1964 | Petersen |
| 3,138,893 A | 6/1964 | Rupar |
| 3,288,405 A | 11/1966 | Johnson |
| 3,368,806 A * | 2/1968 | Szonn ........................... 267/1 |
| 3,516,112 A | 6/1970 | Neville et al. |
| 3,573,401 A | 4/1971 | Lininger |
| 4,355,777 A | 10/1982 | Greenstreet |
| 4,368,864 A | 1/1983 | Tobey |
| 4,396,177 A | 8/1983 | Liebl |
| 4,767,105 A | 8/1988 | Caspers |
| 4,879,857 A * | 11/1989 | Peterson et al. ......... 248/632 X |
| 4,880,077 A * | 11/1989 | Verse et al. ............. 248/638 X |
| 4,923,158 A * | 5/1990 | Saisho ..................... 248/188.8 |
| 4,979,786 A | 12/1990 | Kuraseko |
| D338,360 S | 8/1993 | Petersen |
| 5,308,036 A * | 5/1994 | Olson et al. ................ 248/638 |
| 5,400,998 A | 3/1995 | Ma |
| 5,681,023 A | 10/1997 | Sheydayi |
| 5,872,340 A * | 2/1999 | Anagnos et al. ......... 248/638 X |
| 6,024,338 A * | 2/2000 | Koike et al. ................ 248/628 |
| 6,155,530 A * | 12/2000 | Borgen ....................... 248/638 |

OTHER PUBLICATIONS

1968–1997 Flexible Vinyl Grommets brochure Kennard Industries, Inc.

* cited by examiner

*Primary Examiner*—Ramon O. Ramirez
*Assistant Examiner*—A. Joseph Wujciak
(74) *Attorney, Agent, or Firm*—Blackwell Sanders Peper Martin

(57) ABSTRACT

A device for control of the effects of vibrations on vibration sensitive equipment when a plurality of the devices are placed on a support surface and in operative contact with the vibration sensitive equipment is a unitary piece of a soft, pliable substance. The device has a top and a bottom and an exterior side wall extending between the top and the bottom. The exterior side wall is formed into a plurality of distinct levels between the top and the bottom, to thereby isolate vibrations which can affect the performance of the piece of vibration sensitive equipment.

19 Claims, 4 Drawing Sheets

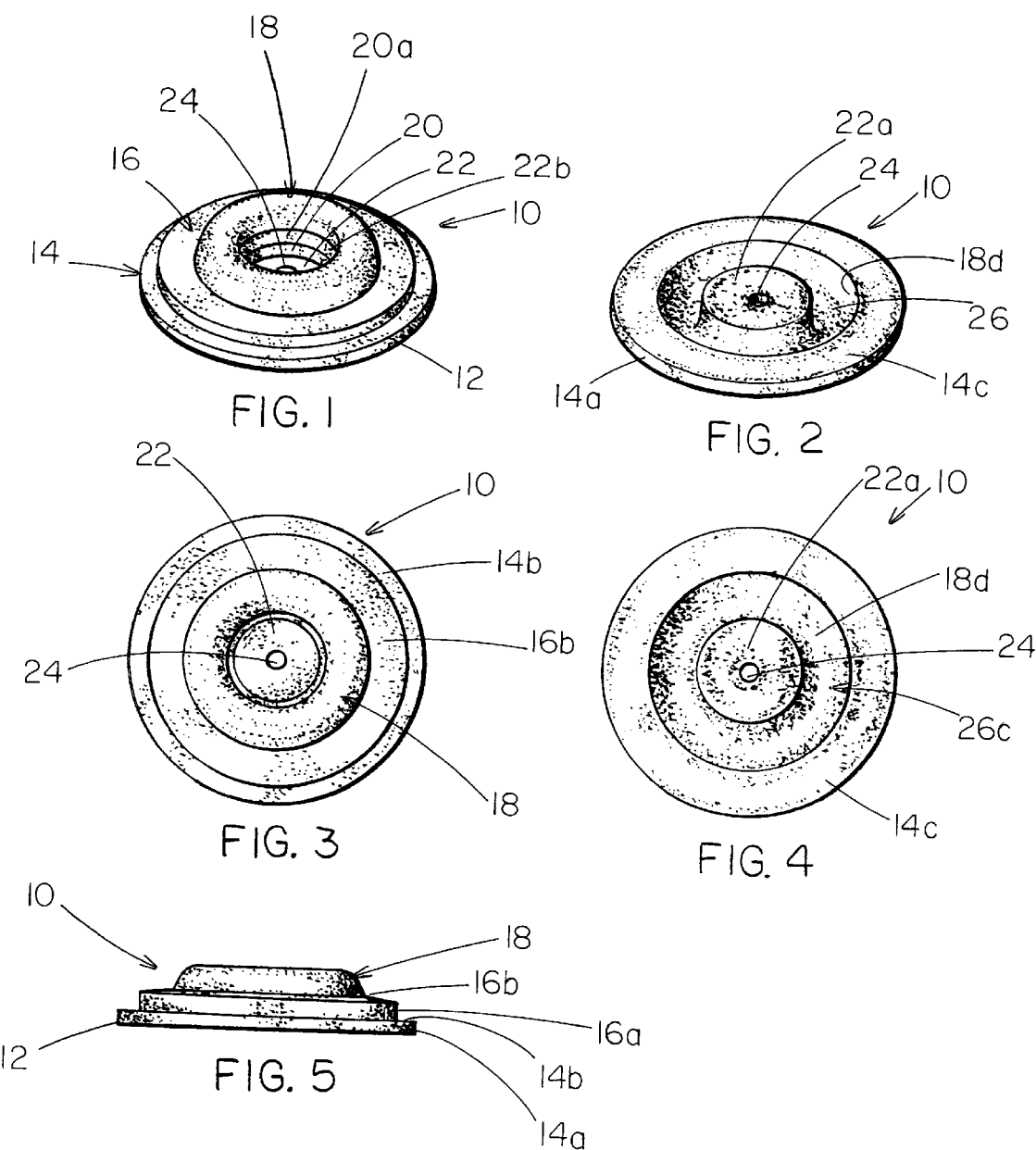

VIBRATION CONTROL DEVICE

BACKGROUND OF THE INVENTION

1. Field of the Invention

The present invention relates generally to the field of vibration isolation mechanisms, and, more particularly, to a vibration control device which provides improved vibration control noise reduction in an economical, easy to use device which is perfectly suited, for example, for improving noise reduction, when used with audio equipment.

2. Background of the Invention

People who spend a significant amount of time listening to music often become particularly astute to hearing extraneous variations, which can be caused by a number of factors. One of the main causes of such performance variations in such equipment is vibration, particularly that which is referred to as "micro" vibration within the audio equipment, such as compact disk ("CD") players, preamplifiers, amplifiers, phonograph stages, and turntables. Other, "macro" vibrations may also happen when a door is slammed, the equipment is bumped, or even from floor movement caused by a person walking in the room. The effects of these types of vibration can also be reduced with the new vibration reduction devices.

The same may be said of visual effects on video equipment, such as laser disk and digital video display ("DVD") players, which become subject to similar vibrations. The irregularities in sound or visual quality of the product caused by the vibration are very distracting to the experienced observer and significantly decrease the quality of the listening or viewing experience for these individuals. Similarly high technology and laboratory equipment such as microscopes, scales, etc. may likewise be negatively affected by vibrations, even to the extent of causing data produced or collected thereon to be unreliable.

Thus, there has been a need for a product which can easily and inexpensively isolate, reduce or "buffer", the effects of vibrations on sound and video equipment or other vibration sensitive machines in order to provide improved performance/product, as well as to reduce wear and tear on the equipment and thus increase the useful life thereof. The new vibration control device described herein has been reviewed by experts in the electronic audio industry and has received extremely complementary reports. Furthermore, it is presently being manufactured and marketed and is rapidly gaining acceptance in the marketplace, as a great improvement on vibration control devices previously known.

Throughout this discussion, and the description and claims below, it is to be understood that references to "noise reduction equipment" and the like are meant to include sound equipment, as well as video and other sophisticated or scientific equipment which is subject to negative effects of external and internal vibrations. For simplicity of the discussion, "audio" or "sound production" equipment will often be used inclusively of any and all types of equipment, the performance of which will benefit from support of the equipment on the new noise reduction devices described below. Further, for simplicity, the new vibration control device will sometimes hereafter be referred to as "VCD" or "device".

Previously, attempts to address the above problems have included use with the performance equipment of such items as isolation cones, spikes, SORBOTHANE (registered trademark of Sorbothane, Inc.) sheets or balls, air isolation platforms, seismic "sinks", and sand boxes, in attempts to dampen the vibrations. However, each of these different methods has certain limitations or disadvantages. Some of the known methods, such as air isolation devices and some seismic sinks are quite expensive and also require a source of pressurized air. However, it is possible to use the new vibration control devices in combination with some known devices, such as seismic sinks, to control different vibration frequency ranges by two independent mechanisms used in complementary fashion.

Products made of SORBOTHANE material are limited in the capability to attenuate vibration. Spikes and cones "drain" vibration to the ground or other support surface, rather than actually isolating the performance device from the vibration; and sand boxes, by definition, include the use of sand, which can be very messy and necessarily creates the risk of inadvertent introduction of sand particles and dust into expensive performance equipment, accessories, tapes, compact disks, and anything else in the vicinity of use of the sand.

SUMMARY OF THE INVENTION

With the above problems and limitations of the known art in mind, the present invention was developed with the goals of providing a vibration isolating device which is inexpensive to produce, durable, and facile to use with little or no instruction, so as to be readily accessible and usable by the anyone, including the most ardent audiophile as well as the less sophisticated user, including those with modest financial means. It is further among the advantages of the present invention that the new vibration reduction device is suitable for manufacture in a variety of sizes or models so as to be capable of handling various sizes of loads and a variety of applications, such as excess noise reduction and vibrations which can affect readings of scientific instruments. It is further intended that the new vibration control device be used as a plurality of same and the number and relative positions of such device in relation to the object being supported thereon be readily selectively variable, to suit the user's needs or particular preferences.

It is further among the objects of the invention, having the features indicated, the new vibration control device not require a source of pressurized air to function, or any extraneous equipment, whether powered, or otherwise, and that it be light-weight and small, for facile placement where needed, that it isolate the unwanted vibration in three separate planes and thus isolate the equipment with which it is used from vibration, rather than simply draining the vibration to the ground.

When the new vibration control devices are used as described hereafter with audio equipment for vibration isolation, the resultant reduction of unwanted sounds ("noise"); i.e., lowering of the "noise floor" (by one expert estimate of about 15 dB) allows for greater dynamics and a perception of increased volume levels. Some users will note that the volume can actually be turned down, relative to their usual listening levels, and good enjoyment of the music still obtained.

Accordingly, in view of the above advantages, the present invention is, briefly, a device for control of the effects of vibrations on vibration sensitive equipment when a plurality of the devices are placed on a support surface and in operative contact with the vibration sensitive equipment is a unitary piece of a soft, pliable substance. The device has a top and a bottom and an exterior side wall extending between the top and the bottom. The exterior side wall is formed into a plurality of distinct levels between the top and the bottom, to thereby isolate vibrations which can affect the performance of the piece of vibration sensitive equipment.

These and other goals and advantages of the invention will be in part apparent and in part pointed out herein below.

BRIEF DESCRIPTION OF THE DRAWINGS

FIG. 1 is an upper perspective view of a vibration control device constructed in accordance with and embodying the present invention.

FIG. 2 is a bottom perspective view of the vibration control device of FIG. 1.

FIG. 3 is a top plan view of the device of FIG. 1

FIG. 4 is a bottom plan view of the device of FIG. 1.

FIG. 5 is a side elevational view of the device of FIG. 1, all sides being identical.

Throughout the drawings like parts will be indicated by like element numbers.

DESCRIPTION OF PRACTICAL EMBODIMENTS

Figure 6A:
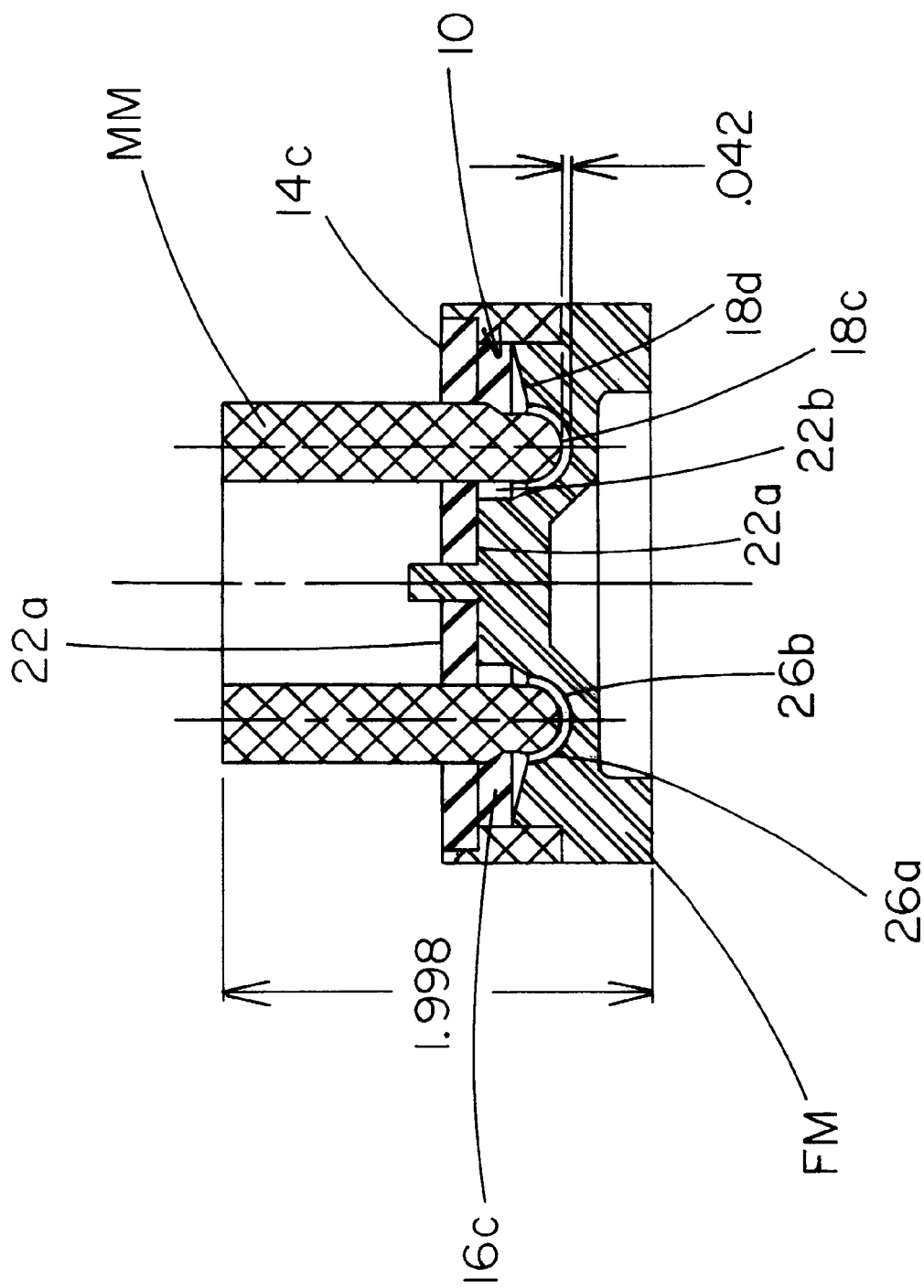
FIG. 6A is a schematic representation of the mold in which the new vibration control device is poured and baked in vertical section.

With references to the drawings, 10 generally designates a vibration control device constructed in accordance with and embodying the present invention. Vibration control device 10 is a unitary piece of pliable material such as rubber, soft vinyl, or the like, preferably having a circular perimeter 12, and three concentric and generally planar levels 14, 16, and 18. When device 10 is disposed as shown in FIGS. 1 and 5, in the most common use position, level 14, with the greatest diameter, is bottom-most and is disposed for use on a substantially horizontal surface, such as a table or bench top, and level 18 is uppermost for direct contact with the piece of sound or other equipment to be supported on a plurality of devices 10.

Ordinarily level 18 will directly contact the undersurface of a piece of sound equipment. In some cases, the device 10 can be disposed beneath preexisting legs (not shown) of the equipment, or will place existing legs, in which case they will be used in an alternative "upside down", direction, opposite to the direction shown in FIG. 1, as replacement "feet" on equipment when the original equipment feet are too small in diameter to place the VCDs directly under the preexisting feet. Either way, there is improved vibration isolation as compared to using none of the new VCDs 10 and the equipment will also stay in place better than when resting on normal "feet".

When formed as preferred, with an annular outer wall at each level, device 10 has the general shape of a truncated cone with stepped outer walls, with the uppermost edge being softened or rounded. Conceivably the new vibration control device can be formed with other than circular outer walls and function quite adequately. However, manufacture of such altered shapes would necessarily be more expensive and thus is not preferred.

Although the size of vibration control device 10 may vary, within reason, so as to be suitable for equipment of different sizes, a very useful size for use with home stereo components has a diameter at level 14 of up to about 2.5 inches, and an overall height of about $9/16^{th}$ inch. A reasonable and generally useful range of sizes is from about 1 ¾ inches to about seven inches in diameter at level 14. However, it is conceived that certain uses could rarely arise for which devices 10, which are smaller or larger may be adequate or even preferred.

As shown in FIG. 3, levels 14 and 16 are preferably circular and each have exterior circumferential walls 14a, 16a, respectively, which, as seen in FIG. 5, preferably extend substantially straight upwardly before extending progressively inwardly in concentric and step-wise fashion toward top level 18. The top surfaces of the steps formed by levels 14, 16 are indicated at 14b, 16b, respectively. As see in FIG. 5, surface 14b is substantially horizontal with respect to the vertical longitudinal axis of device 10. Fop surface 16b, however, slopes gently upwardly and centrally.

Top level 18 is formed as a convex, upwardly curved circular shoulder (or "doughnut"), with an external radius which is preferably about 0.207 in., and which completely surrounds a central well 20, having a continuous inner side wall 20a, which terminates at the lower end thereof by intersecting with a floor 22. Wall 20a can include a stepped portion 22b around the intersection with floor 22, for added strength, or can be substantially straight up and down.

An alternative embodiment appears exactly as that shown, except that the upwardly curved shoulder is slightly flattened, as though the "doughnut" had been pressed gently downwardly under a flat weight. Floor 22 is preferably, although not necessarily penetrated by a small aperture 24 which can be caused to facilitate optional connection of device 10 by a conventional connector, usually a screw, or even a brad, for example, to a unit of sound equipment (when the devices 10 are disposed upside down) or to some other mounting surface, such as the surface of a work bench.

FIGS. 2 and 4 illustrate the under side of VBC 10, showing the central circular bottom surface 22a of floor 22, the bottom surface 14c of level 14 and the severely concave underside of level 18. Bottom surface 14c of level 14 is preferred to be slightly concave, as indicated by the shading in FIGS. 2 and 4, with the inner and outer perimeters extending slightly outwardly from the area therebetween, so that when pressed against a smooth flat support surface, surface 14c forms a slight vacuum against the support surface, to discourage slippage of the sound sensitive equipment on the support surface. Similarly bottom surface 22a of floor 22 is also slightly concave between aperture 24 and the outer perimeter of the surface 22a in the preferred embodiment. Although the described concave surfaces are the optimal construction, a modification of the new device 10 with surfaces 14c and/or 22a substantially flat would still be considered within the scope of the invention, although noise reduction performance would not be of the highest possible quality. In FIG. 6A surface 14C appears flat, rather than concave, for simplicity of the figure.

Figure 6B:
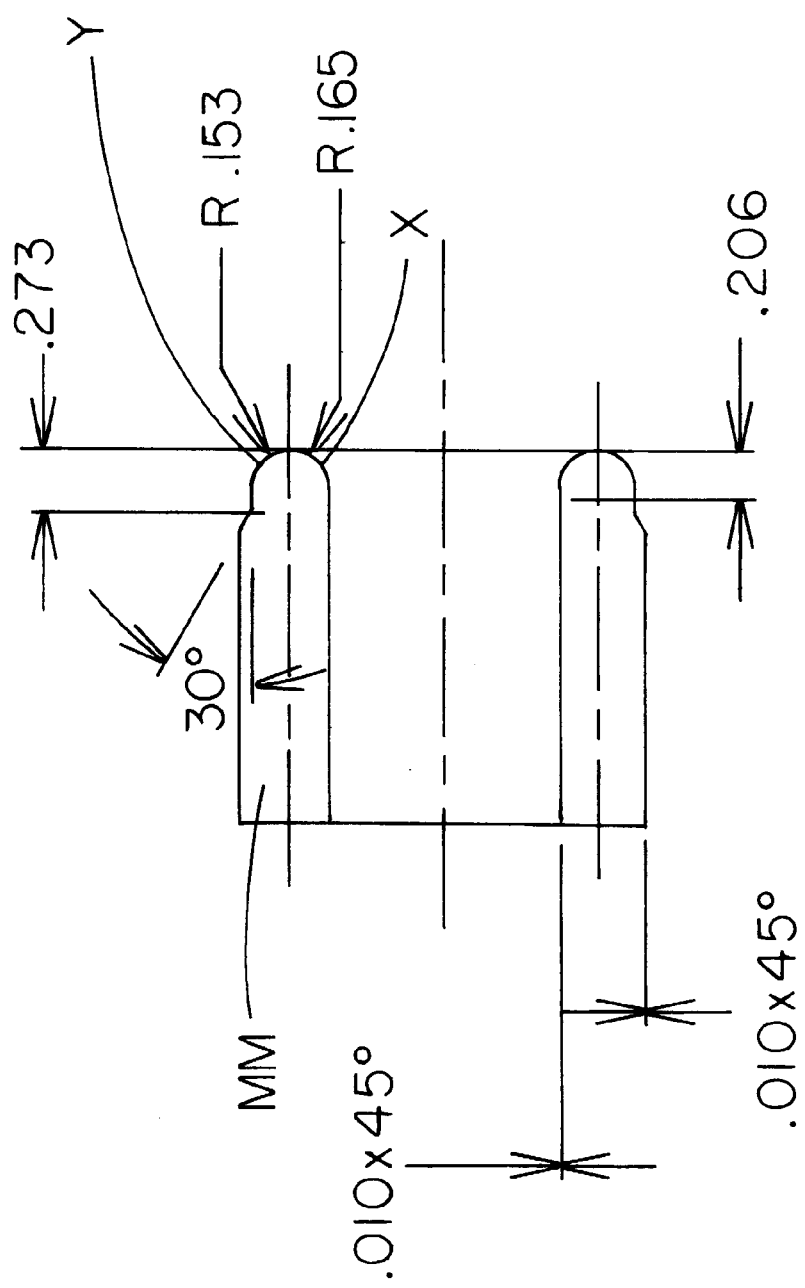
FIG. 6B is a schematic, sectional side view of the male mold with which VCD is formed, showing an example of practical dimensions therefore including the different radii forming portion for assisting, in breaking tip of harmonics.

FIG. 6A illustrates schematically and in vertical section examples of a mold assembly in which VBC 10 is poured and baked, with a vibration control device 10 disposed therein. The figure shows an example of reasonable dimension considered for forming the thickness of device 10 at the point of curvature at the top of level 18 (device 10 being upside down in the mold, as formed), with a clearance of 0.042 in. between the two portions FM, MM of the mold assembly. Variation in this dimension within a range of about 0.030 in. to about 0.200 in. is considered reasonable and useful and can be selectively altered by changing the length of mold "shut height" pins mounted on the male mold plate to which male mold MM is affixed, by inserting shims (not shown) between the plate and the shut height pins. FIG. 6B also shows other useful dimensions of the male mold, as one example only, that will result in corresponding dimensions in a device 10 formed therewith.

Between the outer perimeter of surface 22a and the inner perimeter of surface 14c there is described a deep, annular channel 26 which terminates in the underside of the arcuate level 18. A key feature of new VBCs 10 is that channel 26 has different radii at the inner and outer aspects 26a, 26b, respectively, of the bottom of the channel. This variation in radii is important in that it causes disruption of harmonic frequencies, and thereby maximally isolates the sound equipment from vibrations. When considering the most common size of device 10, with the 2.5 inch diameter, the preferred radii of the male mold used to form device 10 are 0.165 and 0.153 inches, at the inner curve X and outer curve Y, respectively, as illustrated in FIG. 6B, showing the male mold used for forming channel 26. Variations of at least about 0.010 inches in these radii can be used with reasonably acceptable vibration reduction results.

Useful variations on these dimensions can be conceived. For example, the radius at X can reasonably vary from about 0.067 in. to about 0.304 in. and the radius at Y can correspondingly vary from about 0.057 in. to about 0.274 in. with acceptable performance results.

Some variations in the shape of the inner and outer side walls of channel 26 can be conceived which will not significantly negatively affect the performance of the new vibration control device in normal use. For example, keeping the desired radii described, the distance between the inner and outer channel walls can be equidistant for the entire height of the wall, until the curves at the bottom of the channel begin. This alternative will omit the small annular angle or step 18d formed by the male mold M, and as seen most clearly in FIG. 6A at 16c, effectively changing the thickness in the channel 26 as the channel outer side wall extends outwardly and level 18 flows into joins 16 (at the "web of the device"), so that upper level 18 wall 18c around channel 26 is heavier and stiffer and will thus flex less than in the embodiment shown and described.

Use of the new devices 10 permits the audiophile to place his or her sound equipment on shelving or other support surface made of virtually any material, including wood, marble, glass, metal, and plastic without reduction in the sound quality, as long as the sound equipment is mounted with the new VCDs between the equipment and the shelf.

Figure 7A:
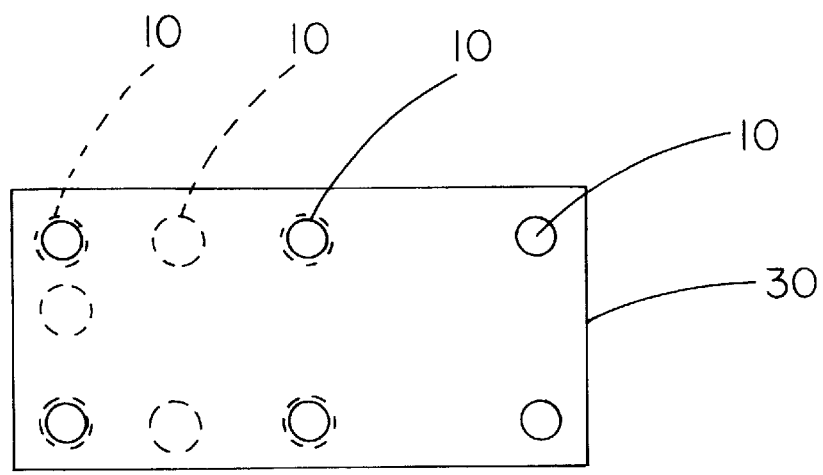
FIG. 7A is a schematic view of one useful arrangement of a plurality of VCDs for supporting a piece of equipment.
Figure 7B:
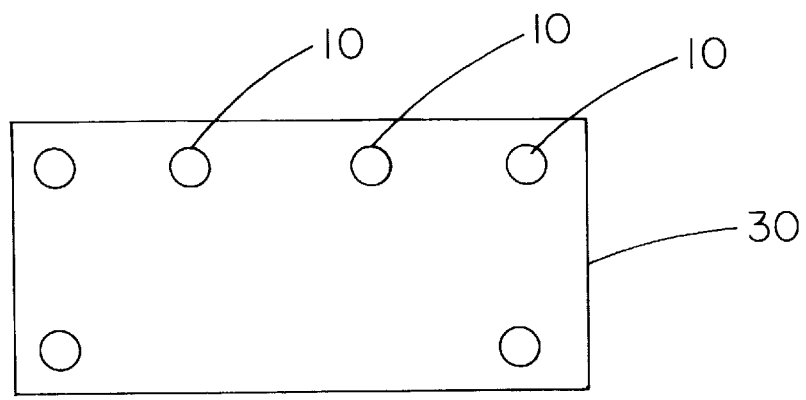
FIG. 7B is a schematic view of an alternate useful arrangement of a plurality of VCDs for supporting a piece of equipment.

In normal use, each device 10 is most usually placed in the position shown in FIG. 1, with level 18 disposed upwardly. However, in some circumstances, and depending upon the sound equipment and user preference, device 10 may be used upside down, relative to the position of FIG. 1. FIGS. 7A and 7B schematically illustrate two practical and useful layouts for the relative positioning of a plurality of devices 10, as they would be disposed on the mounting surface, the outline indicating the outer edge 30 of the piece of sound equipment to be placed on the devices 10. Devices 10 can optionally be attached, for example by removing the legs of the equipment and connecting the VCDs directly to the base of the equipment, through aperture 24 or, if preferred or required, the devices 10 may simply be disposed in preselected positions, but loose and unattached on a support surface beneath the sound equipment.

Figure 7C:
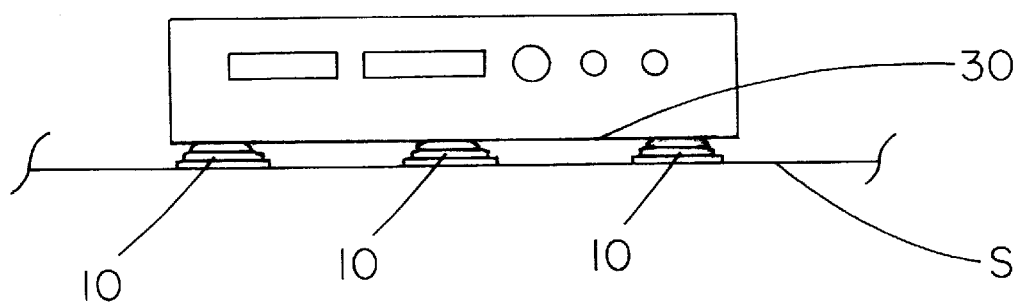
FIG. 7C is a schematic front elevational view of the equipment and VCDs arranged as in either of FIG. 7A or 7B.

Testing has indicated that the best performance in vibration isolation and improved sound quality is obtained by placing the devices 10 outwardly toward the corners and substantially equally spaced along the edges of the sound equipment, as illustrated in FIG. 7A. However, in some circumstances, an altered arrangement, such as that shown in FIG. 7B, for example, with more of the devices 10 disposed along one side than the other, may be preferred, or will suffice. For example, if the sound equipment has some structural element toward one edge which would interfere with uniform placement of the devices 10 equally around and adjacent to the perimeter, then positioning the VBCs slightly inwardly of such interfering element, or otherwise to avoid it is still useful and will still result in improved sound quality. In the case of the above hypothetical practical arrangement of devices 10 beneath a piece of equipment on a support surface S, as illustrated in FIG. 7A, the general appearance from the front edge will be similar to that illustrated schematically in FIG. 7C, with devices 10 having the general appearance of short legs beneath the equipment supported thereon.

Some equipment, such as certain tube-based amplifiers and preamplifiers, can be extremely unbalanced in weight distribution, because of the transformers used in such equipment. In these instances, the user can merely 1) place higher model number VCDs (described below) under the heavier areas and lower model number VCDs under the lighter equipment areas, or 2) distribute the multiple VBCs 10 beneath the equipment so that the weight is supported above the devices 10 relatively proportionately; i.e. more devices 10 may be placed beneath the heavier side of a piece of equipment than under the lighter side thereof, as indicated, for example, in the schematic of FIG. 7A, in phantom.

Ideally, the weight of sound equipment per VBC 10 used therewith is according to recommended limits. However, even when the devices 10 are overloaded, within reasonable limits, improved sound quality as a result of vibration isolation is still obtained, as compared to known vibration isolating mechanisms. Is it expected that devices 10 will be made available in at least five models (all with an approximate ⁹⁄₁₆th inch overall height and 2.5 inch diameter at level 14), with preferred or "suggested" weight loads per unit, and a reasonable range of weights per unit, is as follows:

| Model | Suggested approx. wt./VCD | General Weight Range/VCD |
|---|---|---|
| 1 | 2.5 pounds | 2–3 pounds |
| 2 | 6.0 pounds | 4–8 pounds |
| 3 | 10 pounds | 10–12 pounds |
| 4 | 16 pounds | 14–18 pounds |
| 5 | 25 pounds | 22–28 pounds |

The above weight parameters specified are intended as examples only and are not intended to limit the invention. The suggested weights and general weight ranges provided are preferred, but not absolute restrictions. If the user elects to stack multiple components of a sound system, for example, the increased weight imposed by additional elements is of course taken into account. Also, it is certainly expected that when components are stacked, that the various pieces will be separated by further devices 10, in keeping with the above principles, so that vibrations will be isolated even more thoroughly than if the devices 10 were placed only under the bottom most component on the support surface.

Thus, the consumer can easily determine how many of the vibration control devices 10 to purchase by obtaining the weight of the piece of equipment to be isolated and dividing by various numbers of devices 10 (e.g., anywhere from at least three to about twelve, or, rarely, even more) to find which model will best suit the need at about the preferred load per each device 10. For example, a piece of equipment weighing approximately thirty-six pounds would be perfectly suited for support by six of the "model 2", listed above, supporting about six pounds each. By contrast, twelve of the "model 5" would accommodate a piece of equipment of up to about 300 pounds. However, in use it has been found that optimal sound results are usually achieved by using a higher number of lower model number units, than with fewer of the higher weight-bearing models of the devices 10.

A further advantage of the vibration control devices 10 is that they can be easily "reconstituted" if they should become somewhat flattened after extended use or excess weight-bearing. This can be accomplished by placing the devices 10 on a flat baking sheet and into an oven at about 175 to about 200° F. and baking for about one half hour. Less time is required if a convection oven is used. After heating the devices 10 are allowed to cool and they will have regained their original shape and thus are reusable in the sense that their original shape and quality of function can be restored even after structural alterations have been encountered.

In view of the foregoing, it will be seen that the several objects of the invention are achieved and other advantages are attained.

Although the foregoing includes a description of the best mode contemplated for carrying out the invention, various modifications are contemplated. As various modifications could be made in the constructions and methods herein described and illustrated without departing from the scope of the invention, it is intended that all matter contained in the foregoing description or shown in the accompanying drawings shall be interpreted as illustrative rather than limiting.

What is claimed is:

1. A device for control of the effects of vibrations on vibration sensitive equipment when a plurality of the devices are placed on a support surface and in operative contact with the vibration sensitive equipment, the device comprising:

a single, unitary piece of a soft, pliable substance, having an integral top, an integral bottom and an integral exterior side wall extending between the top and the bottom, the exterior side wall being formed into a plurality of distinct levels of varying external dimension between the top and bottom, to thereby isolate the vibrations which can affect the performance of the piece of vibration sensitive equipment wherein the exterior side wall is formed into three distinct levels comprising an upper level, a lower level, and a middle level between the upper level and the lower level, and further wherein the middle level has an upper surface which slopes radially outwardly and downwardly.

2. The device of claim 1, wherein the top of the device is depressed to form a well therein.

3. The device of claim 2, wherein the well has a floor.

4. The device of claim 3, wherein the floor of the well defines an aperture therethrough, to accommodate a connector, to thereby connect the device to the vibration sensitive equipment, when the device is placed in contact with the vibration sensitive equipment in a position upside down relative to the normal operative position.

5. The device of claim 1, wherein the exterior side wall of the single unitary piece has a continuous and uninterrupted perimeter.

6. The device of claim 1, wherein the exterior side wall is circular and the plurality of distinct levels are disposed concentrically with relation to one another.

7. The device of claim 6, and further wherein the bottom of the single unitary piece has a channel formed therein, the channel being annular and disposed concentrically in relation with the perimeter of the exterior side wall.

8. The device of claim 1, wherein the lower level has a greater outside dimension than the middle level or the upper level.

9. The device of claim 1, wherein the upper level has a smaller outside dimension than the lower level or the middle level.

10. The device of claim 1, and further wherein the bottom of the single unitary piece has a channel formed therein, the channel having an inner wall which forms the perimeter of the well formed in the upper level.

11. The device of claim 10, wherein the channel has a bottom with an inner aspect and an outer aspect.

12. The device of claim 11, wherein the radius of the inner aspect of the channel is different than the radius of the outer aspect of the channel.

13. The device of claim 11, wherein the radius of the inner aspect of the channel is about 0.165 in.

14. The device of claim 11, wherein the radius of the outer aspect of the channel is about 0.153 in.

15. The device of claim 1, wherein the device is formed of vinyl.

16. A device for control of the effects of vibrations on vibration sensitive equipment when a plurality of the devices are placed on a support surface and in operative contact with the vibration sensitive equipment, the device comprising:

a single, unitary piece formed of a soft, pliable substance, having an integral top, an integral bottom and an integral exterior side wall extending between the top and the bottom, the exterior side wall being formed into a plurality of distinct levels of varying external dimension between the top and bottom, to thereby isolate the vibrations which can affect the performance of the piece of vibration sensitive equipment;

wherein the exterior side wall is formed into three distinct levels comprising an upper level, a lower level, and a middle level between the upper level and the lower level, and further wherein the lower level has a bottom surface which is concave.

17. The device of claim 16, wherein the top of the device is depressed to form a well therein.

18. The device of claim 17, wherein the well has a floor.

19. The device of claim 16, wherein the exterior side wall of the single unitary piece has a continuous and uninterrupted perimeter.

* * * * *